United States Patent [19]
Glassmeyer

[11] 3,898,873
[45] Aug. 12, 1975

[54] TESTING DEVICE AND METHOD FOR TESTING CONTAINERS

[75] Inventor: John J. Glassmeyer, Covington, Ky.

[73] Assignee: Pullman Incorporated, Chicago, Ill.

[22] Filed: July 16, 1973

[21] Appl. No.: 379,697

[52] U.S. Cl. .................................. 73/88 R; 220/1.5
[51] Int. Cl.² .......................................... G01N 3/08
[58] Field of Search .............. 73/88 R, 65, 101, 103; 220/1.5; 294/67 DA, 67 DB, 67 DC

[56] References Cited
UNITED STATES PATENTS
3,480,174  11/1969  Sherwood ............................ 220/1.5
3,691,595  9/1972   Backteman et al. ............. 220/1.5 X

*Primary Examiner*—Charles A. Ruehl
*Attorney, Agent, or Firm*—Richard J. Myers

[57] ABSTRACT

Intermodal cargo containers are bottom lift tested by means of a test fixture including adjustable supports which are connected to the lower corner fittings to maintain the container in a raised position free of a supporting surface. The upper corner fittings are first connected to a suitable hoisting device and upon lifting are placed in tension. The lower corner fitting lifting capability of the container is then tested by releasing the tension in the cables, the said bottom lift test fixtures being placed in compression. The text fixtures are readily adaptable for accommodating different lengths of containers.

9 Claims, 5 Drawing Figures

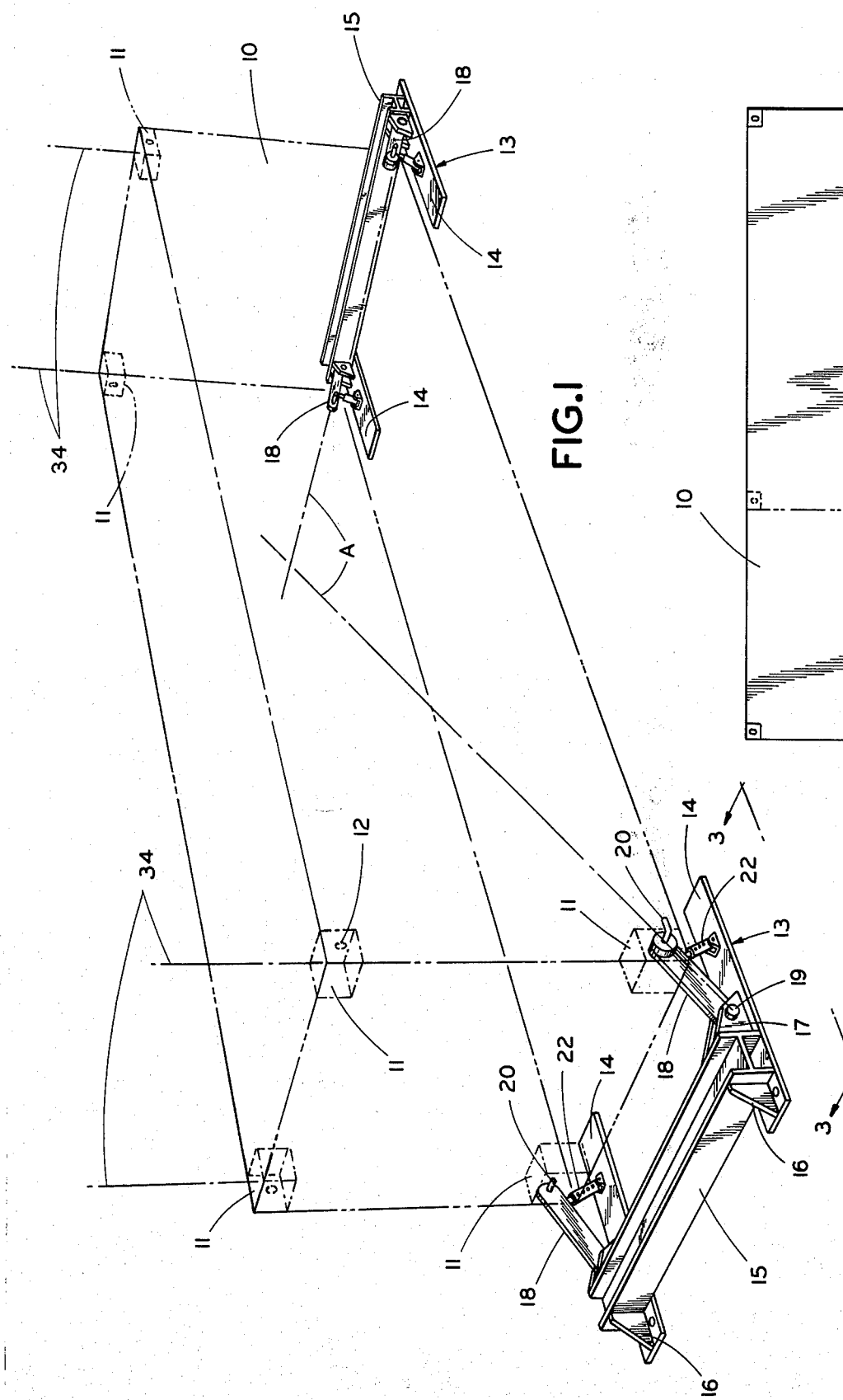
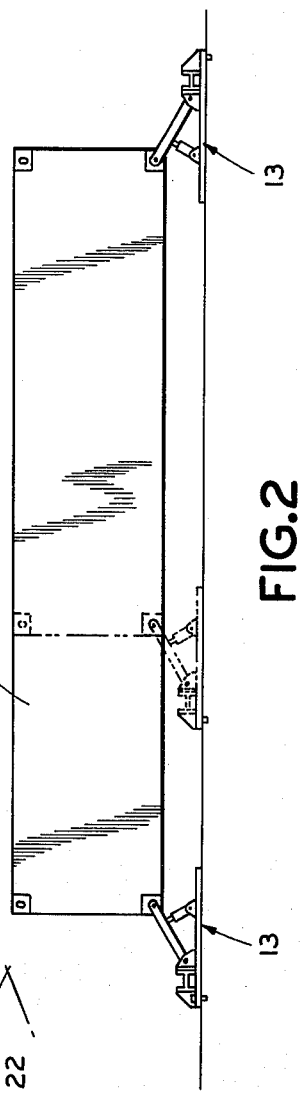

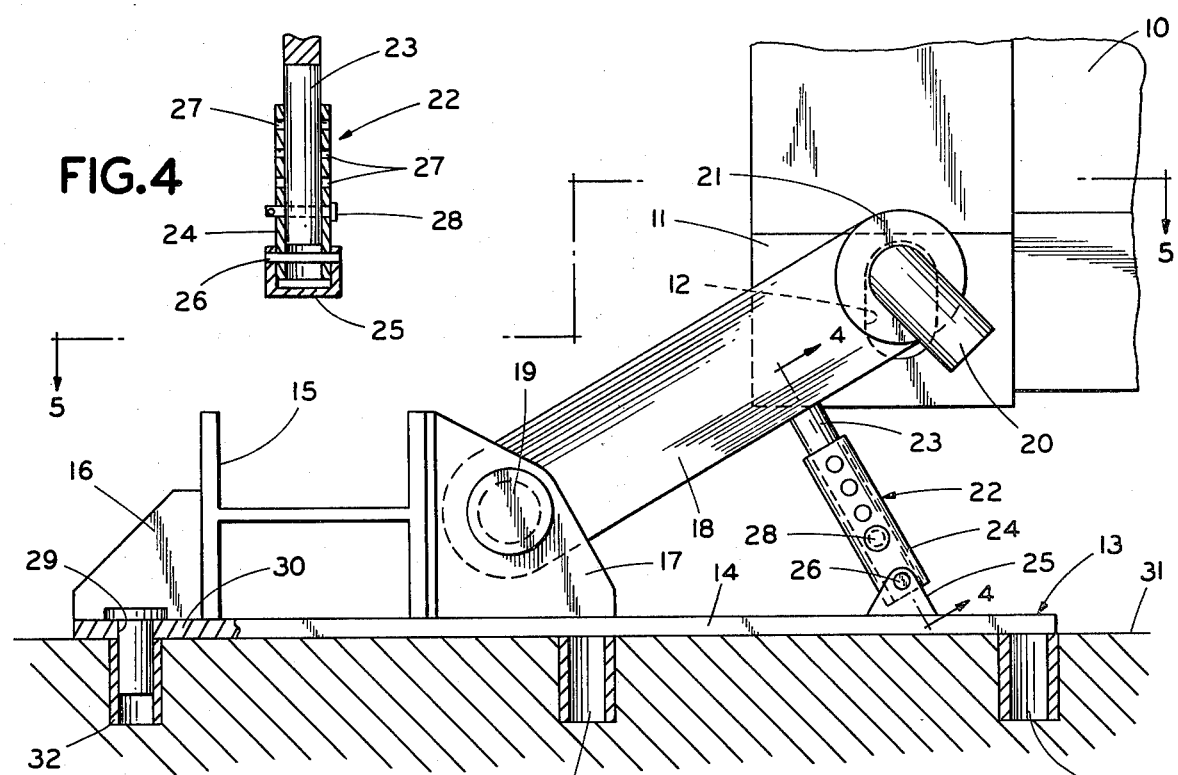
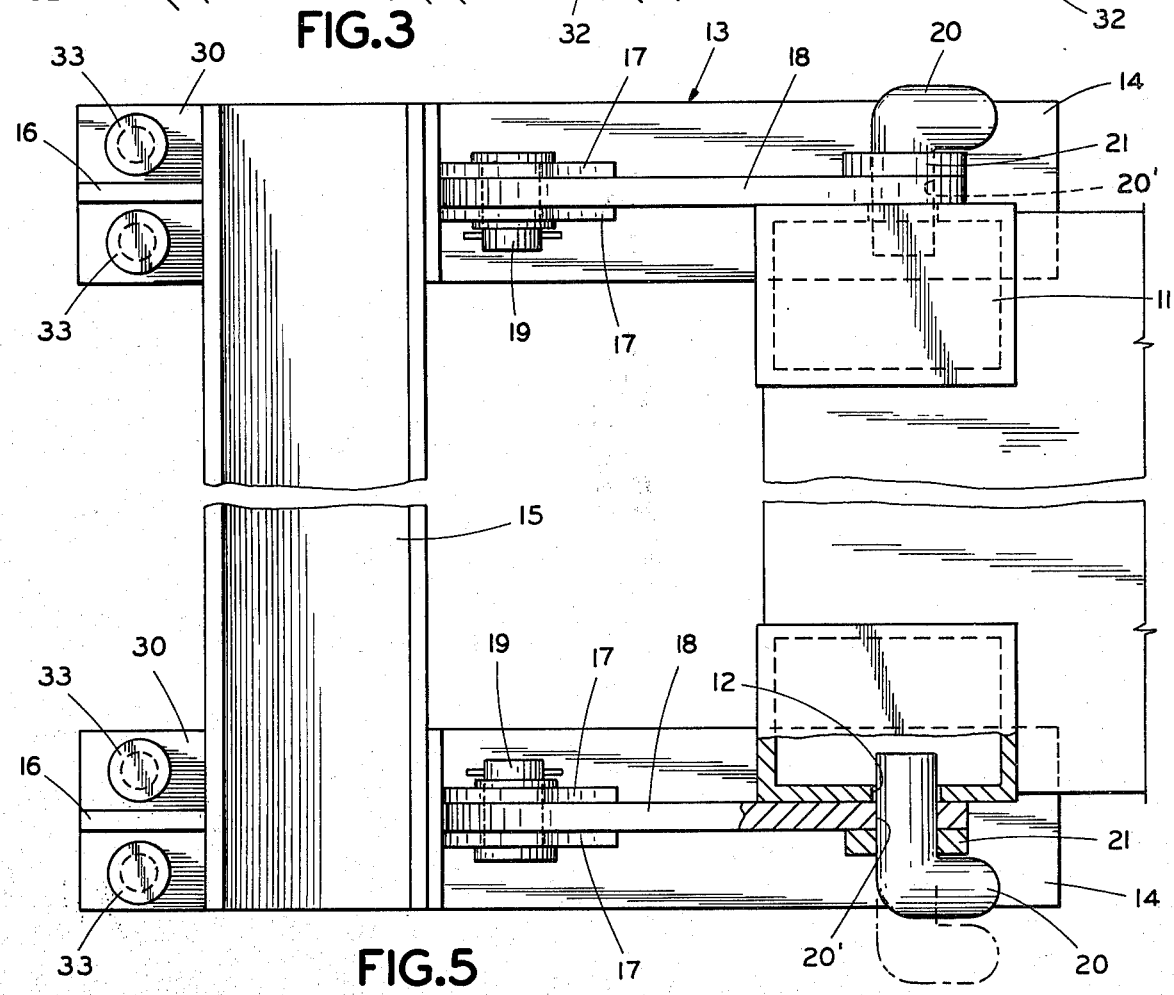

TESTING DEVICE AND METHOD FOR TESTING CONTAINERS

BACKGROUND OF THE INVENTION

1. Field of the Invention

The field of invention pertains to cargo containers having standardized corner fittings utilized for lifting and handling of containers.

2. Description of the Prior Art

Fixtures for supporting containers on the ground or other supporting surfaces are disclosed in such U.S. Pat. Nos. as 1,984,712 - Dec. 18, 1934; 2,043,820 - June 9, 1936; 2,415,018 - Jan. 28, 1947 and 3,360,141 - Dec. 26, 1967. Fixtures of this type, however, have not been provided for the testing of the lifting integrity of standardized containers. These devices therefore do not have the function nor the structure required to accomodate a testing procedure of the type herein disclosed.

SUMMARY OF THE INVENTION

It is a prime object of the present invention to provide an improved test fixture which can readily be utilized for testing the lower corner fitting lifting capabilities of a container which also permits the upper corner fitting lifting capability to be tested in a conventional manner. The fixture is particularly adaptable for different lengths of containers and is so designed as to place the lower corner fittings under a test wherein similar stress forces are encountered such as may occur in lifting the container with sling cables.

BRIEF DESCRIPTION OF THE DRAWINGS

FIG. 1 is a perspective view of a conventional container supported on a pair of test fixtures designed to test the lower corner fitting lifting capability of the container;

FIG. 2 is a side schematic elevational view showing the adaptation of test fixtures of containers of various lengths;

FIG. 3 is a side elevational view taken substantially along the line 3—3 of FIG. 1;

FIG. 4 is a cross-sectional view taken substantially along the line 4—4 of FIG. 3; and FIG. 5 is an elevational view taken substantially along the line 5—5 of FIG. 3.

DESCRIPTION OF THE PREFERRED EMBODIMENT

Various organizations and associations concerned with cargo containers have been certified to formulate rules which require testing of containers to prove their capability of being lifted by sling cables or chains engaging the side apertures of the bottom corner fittings. The standard containers utilized in the United States are provided with standard corner fittings which meet the specified requirements of United States as well as foreign standard organizations so that the containers can be shipped internationally and will accept standard handling mechanisms. Containers of this type may generally be handled by cranes which include a spreader having four cables which in turn are connected to the upper corner fitting so as to exert a vertical upward lifting force on said fittings and the surrounding structure of the container. The lower corner fitting lifting capability also may be tested by securing the lower ends of the cables to the lower corner fittings. The standards of testing usually requires the utilization of a single spreader which is disposed approximately 24 inches above the container roof at the mid point of the container. As tests for testing the lower corner fitting lifting capability are written the chains or lifting cables are not supposed to bear against the container side walls, the same to be spaced during the lifting of the container at least 1½ inches from the side wall of the container. The container is also loaded with cargo to a specified weight.

The testing of the upper container fitting lifting capability presents very little problem since the container is merely lifted upwardly with the four slings or chains suitably connected to the upper four fittings. In practice, however, it has been found that connection of the slings to the lower corner fittings causes considerable problems and in many instances results in damage to the side walls of the container. Also, the highly stressed cables or slings present a definite hazard to personnel when the cables are connected to the lower corner fittings. The present invention relates to an improved fixture and method employed for testing the lower corner fitting lifting capability of a container.

Referring now particularly to FIG. 1, a container 10 includes upper and lower corner fittings, corner connecting or connector elements 11, each of which includes at least one elongated recess 12. The container 10 in FIGS. 1, 2 and 3 is shown as being supported on testing device or fixtures 13 which each include longitudinally extending base plates 14. The base plates 14 are suitably interconnected by a transversely extending I-beam 15 having backup gussets 16 and including hinge brackets 17 suitably connected to the base plates 14 and the I-beam 15. Each of the test fixtures 13 comprises a pair of pedestal arms 18 which are hingedly connected by means of hinge pins 19 to the brackets 17. The arms 18 extend diagonally upwardly and by means of a connector plug 20, which extends through openings 20' in the arms 18, connects the pedestal arms 18 to the lower corner connecting or connector elements 11. The connector plug 20 is adapted to be secured within the elongated recess 12 of each connector element as indicated. A stop collar 21 is rigidly secured to each of the connector plugs 20. A telescoping strut 22 supports each arm 18. As best shown in FIGS. 3 and 4, each telescoping strut 22 includes a rod 23 rigidly connected to the arm and projecting downwardly perpendicularly with respect thereto. Each rod 23 is received within a tubular strut part 24 and a hinge bracket 25 connects the tubular strut part 24 to each base plate 14 by means of a hinge pin 26.

As best shown in FIG. 4, aligned openings 27 through the tubular strut part 24 permit the insertion of a lock pin 28 for securing together the rod 23 and tubular strut part 24. As best shown in FIGS. 3 and 5, openings 29 are provided in flat plates 30 suitably connected to the I-beam 15 and the gussets 16. A horizontal surface which may be a concrete slab, drive, or the ground may include a horizontal surface 31 containing a plurality of tubular elements 32 recessed within said surface 31. Depending upon the length of the container, as illustrated in FIG. 2, the openings 29 are placed in registry with the particular tubular elements 32 as desired, and by inserting the pins 33 each fixture 13 is supported against longitudinal displacement at the lower corners of the container.

As indicated previously, the container corner fittings may be castings or forgings and are usually of a standardized design having a number of openings which permit the containers to be stacked and connected together or placed side by side with proper interconnecting means. The recesses 12 disclosed are also used for the lifting of the container by means of slings, cranes, etc.

As indicated, the fixture 13 may be utilized for ready accommodation and use with containers of different length and the vertical end of the arm 18 may be adjusted to accommodate different containers by the adjustment of the telescopic strut 22. Thus the fixtures may be easily and quickly secured to a container for testing purposes. In the tests, cables 34 are suitably connected to the upper corner castings 11 and the ends of the cables 34 are supported on a spreader (not shown) which in turn is connected to a suitable crane or other lifting mechanism. The container has been loaded to a test weight and the top lift capability thus may be tested by lifting. The lifting or reactive forces are in a vertically upward direction along the lines designated by the cables 34.

During the test, the fixtures may be readily applied to the lower corner castings 11 as disclosed in FIG. 1 by merely adjusting the ends of the arm 18 to the desired height so that the openings within said arms register with the openings within the container brackets. By inserting the plugs 20, while the container is suspended above the ground by means of the slings 34, the lower fixtures are now placed in locked position relative to the lower corner fittings. The container with fixtures is now lowered and the lower corner lifting capability is then being tested, since the entire weight of the container and its cargo is directed against the lower corner castings which are now also provided with a diagonally upwardly extending lifting or reactive force.

Thus it is clear that the lower corner fitting lifting capability is being tested as the fixtures support the container free of the supporting surface. The forces are generally the same in an upward direction diagonally as indicated by the broken line A in FIG. 1.

What is claimed is:

1. A testing device for a container having upper and lower connector elements located at the upper and lower corners of said container, each connector element including at least one horizontal extending recess, a lifting device connected to the upper connector elements for lifting the container and for effecting exertion of an upward reactive force on said upper connector elements, said testing device comprising
   a horizontal support surface and a plurality of supports located on said surface, each of said supports including a base,
   a support pedestal on said base extending upwardly relative thereto,
   said pedestal of each support including an arm and strut means connected to said arm, said arm and said strut means being hingedly connected to said base in opposed and spaced relation to each other such that said strut means extends diagonally upwardly from said base,
   said arm having an opening alignable with the recess of a lower connector element of the container, the opening being disposed above said support surface,
   said strut means including longitudinally adjustable means for effecting hinged movement of said arm relative to said base and alignment of the opening of said arm with the recess of a lower connector element, and
   removable connecting means receivable in the opening of each arm and the aligned recess of each lower connector element for connecting the arms to the lower connector elements of the container in order that the lower connector elements of the container support the container above and in spaced relation to said surface so that testing of the lower connector elements of the container is effected as the lifting device is lowered relative to the container.

2. The invention in accordance with claim 1 wherein said removable connecting means is comprised of removable plug means; and said plug means including stop collar means.

3. The invention in accordance with claim 1 wherein said longitudinally adjustable means comprises a pair of telescoping members.

4. The invention in accordance with claim 3 wherein the pair of telescoping members have alignable openings, and pin means receivable in the alignable openings for locking the pair of telescoping members together.

5. The invention in accordance with claim 1 wherein said base includes openings, said surface includes tubular elements alignable with the openings in said base, and pin means receivable in an opening and a tubular element aligned relative to the opening, the pin means in the opening and the aligned tubular element for securing said base against displacement relative to said support surface.

6. The invention in accordance with claim 1 wherein said plurality of supports include a pair of supports; and beam means interconnecting the bases of said pair of supports.

7. The invention in accordance with claim 1 wherein said arm extends diagonally upwardly from said base.

8. A method of testing the lifting capability of a container carrying a test load and having connector elements located at the upper and lower corners of the container, each connector element including a horizontally extending recess, a plurality of supports on a support surface, each one of the supports having a base and an arm hingedly connected to and disposed above the base, each arm having an opening alignable with the recess of a lower connector element, a lifting device connected to the recess of each one of the upper connector elements, said method comprising the steps of:
   aligning the recesses of the lower connector elements with the openings of the arms of said supports as the lifting device is connected to the recesses of the upper connector elements and suspends the container above the support surface,
   inserting removable connecting elements in the aligned openings and recesses of the arms and lower connector elements for connecting the container to the supports, and
   lowering the lifting device along with the container in order that the container is supported by said removable connecting elements at the lower connector elements of the container such that the container is disposed above and spaced from the support surface and such that each one of said removable connecting elements exerts a diagonally upwardly extending reactive force against a lower connector element of the container.

9. A method in accordance with claim 8 wherein said method includes the additional step of exerting an upward reactive force on said upper connector elements of the container as the lifting device together with the container is lifted relative to the surface without the lower connector elements of the container being connected to the supports.

* * * * *